(12) United States Patent  
Feiste

(10) Patent No.: US 7,949,857 B2
(45) Date of Patent: May 24, 2011

(54) METHOD AND SYSTEM FOR DETERMINING MULTIPLE UNUSED REGISTERS IN A PROCESSOR

(75) Inventor: Kurt A. Feiste, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 12/100,295

(22) Filed: Apr. 9, 2008

(65) Prior Publication Data

US 2009/0259815 A1 Oct. 15, 2009

(51) Int. Cl.
*G06F 9/50* (2006.01)
(52) U.S. Cl. ........................................................ 712/217
(58) Field of Classification Search .................. None
See application file for complete search history.

(56) References Cited

U.S. PATENT DOCUMENTS

| | | | |
|---|---|---|---|
| 6,438,740 B1 * | 8/2002 | Broder et al. ................. | 712/228 |
| 6,516,383 B1 | 2/2003 | Patra et al. | |
| 6,961,822 B2 | 11/2005 | Rozario et al. | |
| 2002/0078303 A1 | 6/2002 | Rozario et al. | |

* cited by examiner

*Primary Examiner* — Robert Fennema
(74) *Attorney, Agent, or Firm* — Dillon & Yudell LLP

(57) ABSTRACT

An improved method, device and system are presented for selecting a predetermined number of unused registers in a processor. The method includes partitioning registers in a processor into subsets; searching each subset for an unused register; determining whether every subset includes an unused register; if so, selecting an unused register from each subset; if not, partitioning the registers into new subsets with each subset having a different combination of registers; searching each of the new subsets for an unused register; determining whether each of the new subsets includes an unused register; if so, selecting an unused register from each new subset; and if not, searching each register serially to find the predetermined number of unused registers.

15 Claims, 5 Drawing Sheets

FIG. 4

Table 402

| Subset | Registers Queried | | | | | | | |
|---|---|---|---|---|---|---|---|---|
| S1 | R0 | R1 | R2 | R3 | R4 | R5 | R6 | R7 |
| S2 | R8 | R9 | R10 | R11 | R12 | R13 | R14 | R15 |
| S3 | R16 | R17 | R18 | R19 | R20 | R21 | R22 | R23 |
| S4 | R24 | R25 | R26 | R27 | R28 | R29 | R30 | R31 |

Table 404

| Subset | Registers Queried | | | | | | | |
|---|---|---|---|---|---|---|---|---|
| S5 | R0 | R1 | R2 | R3 | R16 | R17 | R18 | R19 |
| S6 | R4 | R5 | R6 | R7 | R20 | R21 | R22 | R23 |
| S7 | R8 | R9 | R10 | R11 | R24 | R25 | R26 | R27 |
| S8 | R12 | R13 | R14 | R15 | R28 | R29 | R30 | R31 |

Table 406

| Subset | Registers Queried | | | | | | | |
|---|---|---|---|---|---|---|---|---|
| S9 | R0 | R1 | R8 | R9 | R16 | R17 | R24 | R25 |
| S10 | R2 | R3 | R10 | R11 | R18 | R19 | R26 | R27 |
| S11 | R4 | R5 | R12 | R13 | R20 | R21 | R28 | R29 |
| S12 | R6 | R7 | R14 | R15 | R22 | R23 | R30 | R31 |

METHOD AND SYSTEM FOR DETERMINING MULTIPLE UNUSED REGISTERS IN A PROCESSOR

BACKGROUND OF THE INVENTION

1. Technical Field of the Invention

The present invention relates in general to the field of computer processors.

2. Description of the Related Art

Picking free (or unused) entries out of a set of entries in a queue is a common task within computer processors. One example is of a processor picking free entries in a queue is register renaming. Machine language programs specify reads and writes to a limited set of registers specified by the instruction set architecture (ISA) of processor. The registers specified by the ISA are the architectural registers. For example, if the ISA of the processor specifies 8 registers in the instruction set, programs written processor will specify operations reading from and writing to those 8 registers. Modern processors, however, are often designed with more physical registers than there are architectural registers specified in the ISA to achieve additional parallelism. Having more physical registers can prevent bottlenecks within a processor and enables faster instruction execution. Instead of waiting for a register specified in the instruction to become available, the processor can use one of the additional physical registers to execute in the instruction in parallel (e.g., "out-of-order" execution). Utilizing the extra physical registers in a processor requires a technique known as register renaming, whereby architectural registers are mapped to physical registers. Logic within the processor performs register renaming, which frequently requires identifying multiple free physical registers in a register file available for mapping to architectural registers.

Picking multiple unused registers at once (in parallel) is difficult because preventing the same register from being picked twice causes a serialization of the process, which results in slower instruction execution. For example, logic within the processor picks the first unused register in a register file for register renaming. Then, from the new set of unpicked registers, the logic picks another register until all needed registers are picked. Such a serialized process requires more time to complete than a process that can take place in parallel. A typical solution to serialization is to restrict each pick to a subset of the registers in the register file in order to ensure that one register isn't picked twice in parallel. The problem with this approach is that an individual subset might not have any unused registers, causing the operation to fail, while another subset might have multiple unused registers.

BRIEF SUMMARY OF THE INVENTION

The present invention provides an improved method, device and system for selecting a predetermined number of unused registers in a processor. In one embodiment, the method includes partitioning registers in a processor into subsets; searching each subset for an unused register; determining whether every subset includes an unused register; if so, selecting an unused register from each subset; if not, partitioning the registers into new subsets with each subset having a different combination of registers; searching each of the new subsets for an unused register; determining whether each of the new subsets includes an unused register; if so, selecting an unused register from each new subset; and if not, searching each register serially to find the predetermined number of unused registers.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

FIG. 4 shows the three different partitioning schemes 302-306 in tabular format.

DETAILED DESCRIPTION OF TILE INVENTION

An illustrative embodiment of the present invention is directed to an improved method, system and computer-readable medium for picking multiple unused registers in a processor. The present invention can take the form of an entirely hardware embodiment, an entirely software embodiment or an embodiment containing both hardware and software elements.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
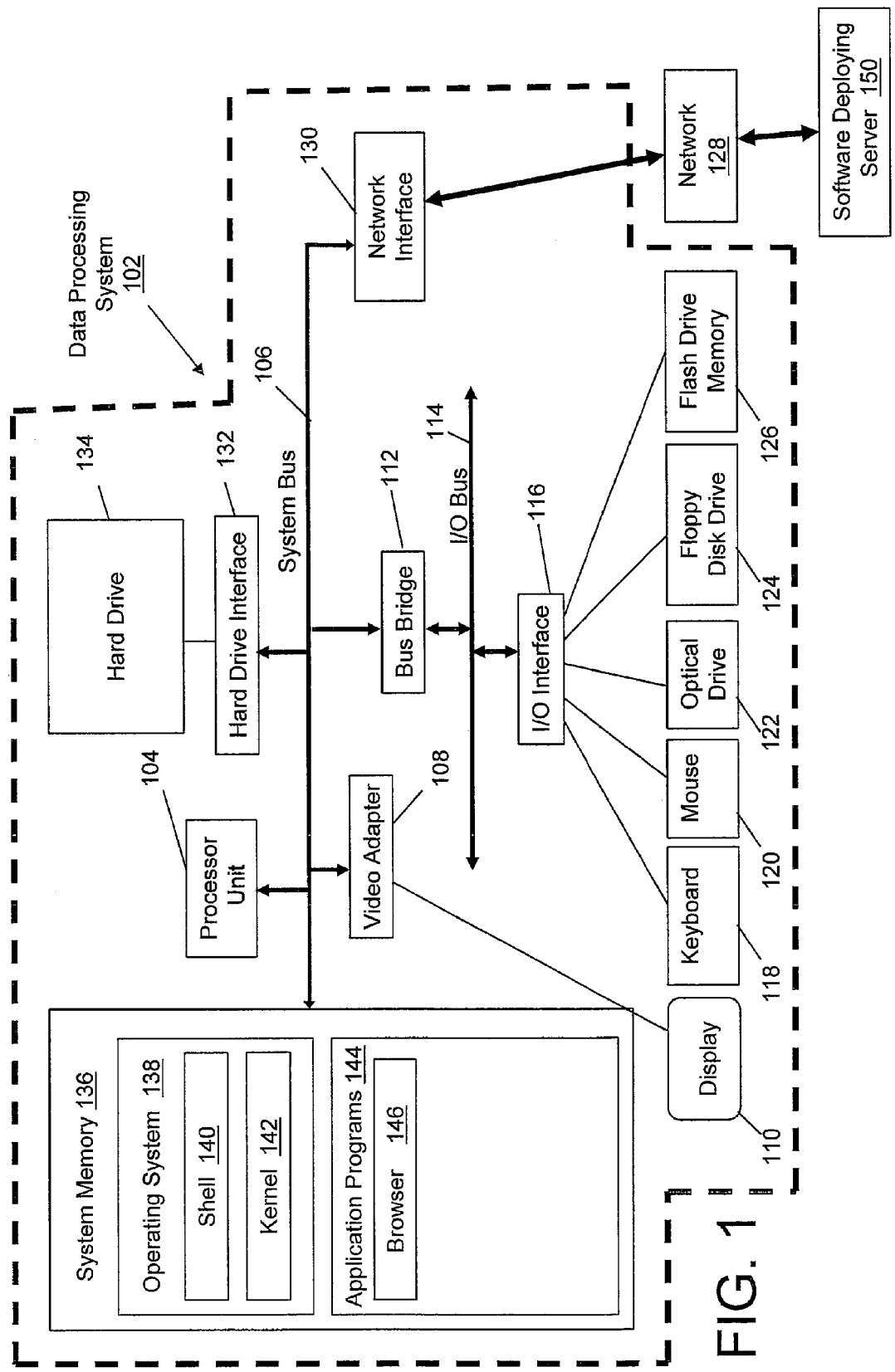
FIG. 1 shows a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. The hardware elements depicted in data processing system 102 are not intended to be exhaustive, but rather are representative of one embodiment of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In an illustrative embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., data processing system 102) to send and receive network messages to the Internet using HyperText Transfer Protocol (HTTP) messaging, thus enabling communication with software deploying server 150.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Figure 2:
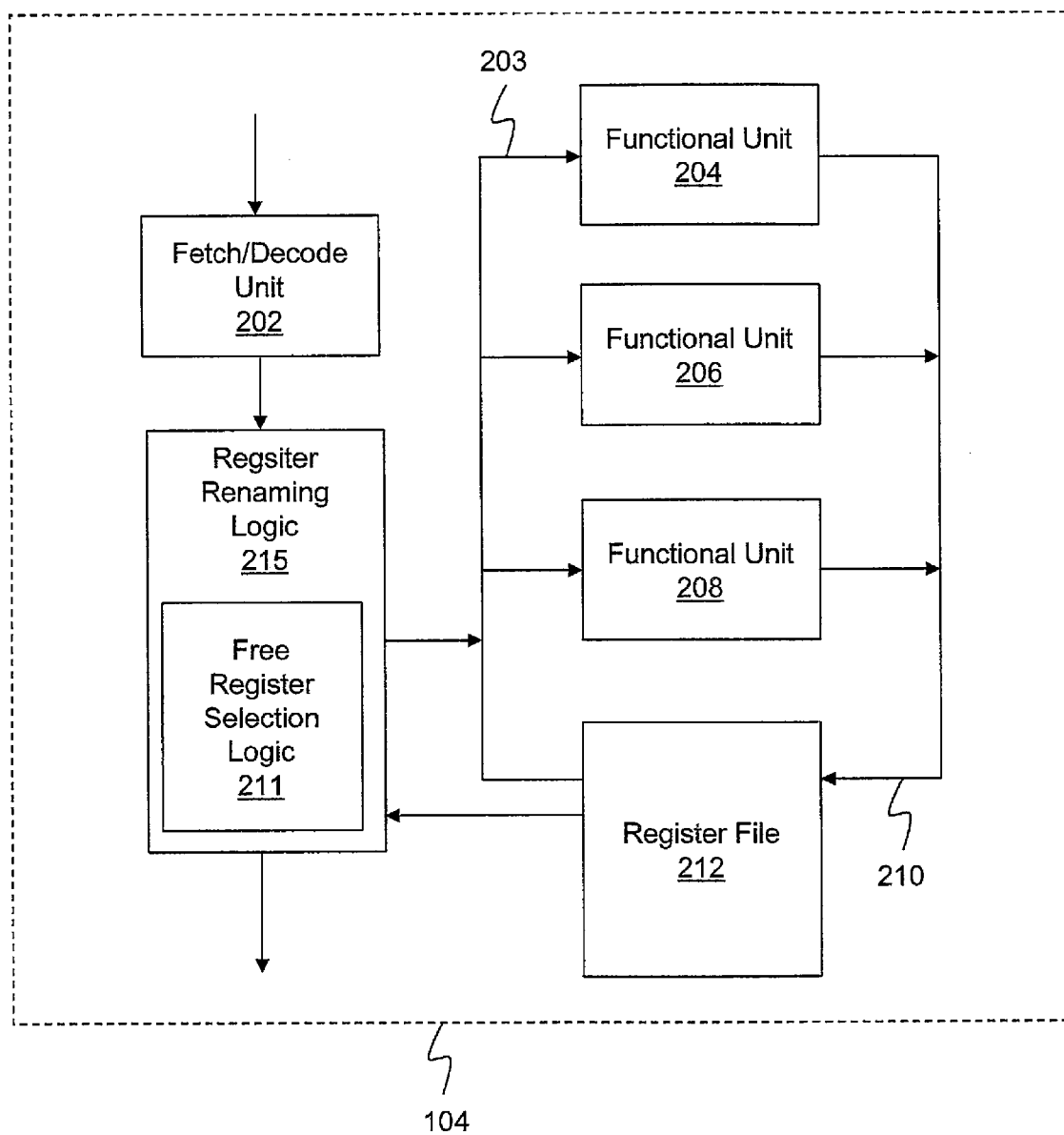
FIG. 2 shows in further detail exemplary processor 104 suited for implementing an embodiment of the present invention.

With reference now to FIG. 2, exemplary processor 104 suited for implementing an embodiment of the present invention is shown in further detail. Processor 104 includes instruction fetch/decode unit 202. Fetch/decode unit 202 fetches program instructions from memory, decodes the instructions and dispatches the instructions for execution by the appropriate functional unit 204-208. Fetch/decode unit 202 is coupled to register renaming logic 215. Register renaming logic 215 includes logic for mapping architectural registers of the ISA of processor 104 to corresponding physical registers in register file 212, which may exceed the number of architectural registers specified by the ISA. Register renaming logic 215 receives the instructions dispatched by fetch/decode unit 202 and renames architectural registers encoded in the issued instructions to corresponding physical registers in register file 212 prior to the execution of the instructions by functional units 204-208. Register renaming logic 215 includes free register selection logic 211. Free register selection logic 211 selects free registers from register file 212 in accordance with one or more embodiments of the present invention, and is disclosed in further detail with respect to FIGS. 3-5.

Register renaming logic 215 is coupled to functional units 204-208 by bus 203. Functional units 204-208 may be any functional unit known in the art for executing instructions, such as an arithmetic logic unit (ALU), an integer unit, a floating point unit (FPU), etc. Functional units 204-208 are coupled to register file 212 by bus 203 and bus 210. Register file 212 contains the registers of processor 104. Operands for issued instructions are loaded by functional units 204-208 from register file 212 via bus 203. Results from instructions executed by functional units 204-208 are stored to register file 212 via bus 210.

Figure 3:
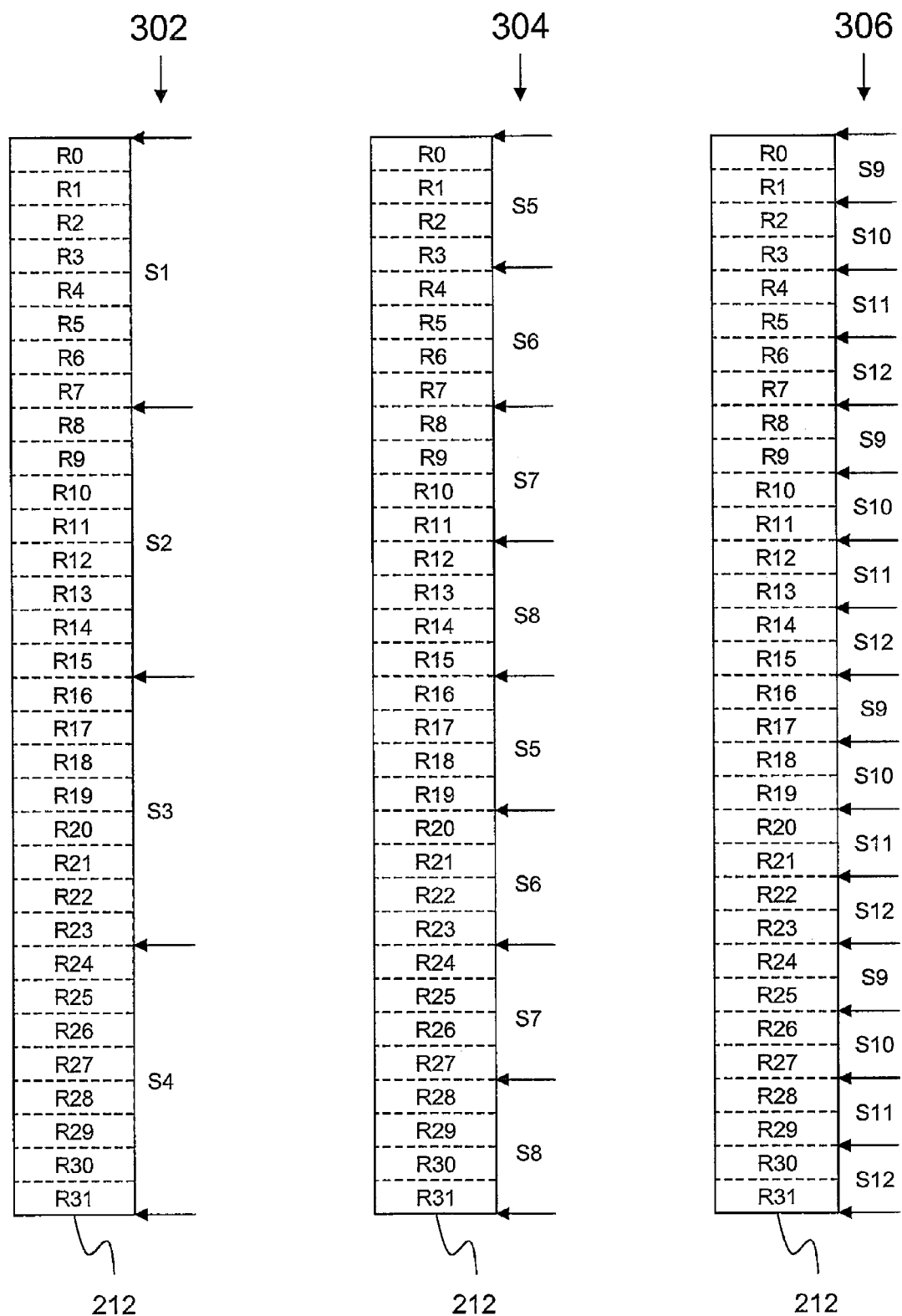
FIG. 3 shows three different partitioning schemes 302-306 for partitioning register file 212 into subsets for conducting queries in parallel to find multiple unused registers.

FIG. 3 shows three different exemplary partitioning schemes 302-306 for partitioning register file 212 into subsets for conducting queries in parallel to find multiple unused registers. Exemplary register file 212 is shown having thirty-two registers R0-R31. It would be obvious to one having ordinary skill in the art that register file 212 may have any number of registers, and that register file 212 is shown having thirty-two registers in FIG. 3 merely as an example. Partitioning scheme 302 consists of subsets S1-S4. Partitioning scheme 304 consists of subsets S5-S8. Partitioning scheme 306 consists of subsets S9-S12. Partitioning register file 212 into unique subsets of registers gives a higher probability of finding the needed number of multiple registers without having to search register file 212 serially with hardware.

FIG. 4 shows the three different partitioning schemes 302-306 in tabular format. Table 402 corresponds to partitioning scheme 302. Table 404 corresponds to partitioning scheme 304. Table 406 corresponds to partitioning scheme 306. Each row shows the registers corresponding to a subset. Each subset includes a different combination of eight registers, and no register is included in more than one subset within the same partitioning scheme. Subsets are searched in parallel to find one unused register in each subset, as described in further detail with reference to FIG. 5. Subset S1 includes registers R0-R7. Subset S2 includes registers R8-R15. Subset S3 includes registers R16-R23. Subset S4 includes registers R24-R31. Subset S5 includes registers R0-R3 and R16-R19. Subset S6 includes registers R4-R7 and R20-R23. Subset S7 includes registers R8-R11 and R24-R27. Subset S8 includes registers R12-R15 and R28-R31. Subset S9 includes registers R0-R1, R8-R9, R16-R17 and R24-R25. Subset S10 includes registers R2-R3, R10-R11, R18-R19 and R26-R27. Subset S11 includes registers R4-R5, R12-R13, R20-R21 and R28-R29. Subset S12 includes registers R6-R7, R14-R15, R22-R23 and R30-R31.

Figure 5:
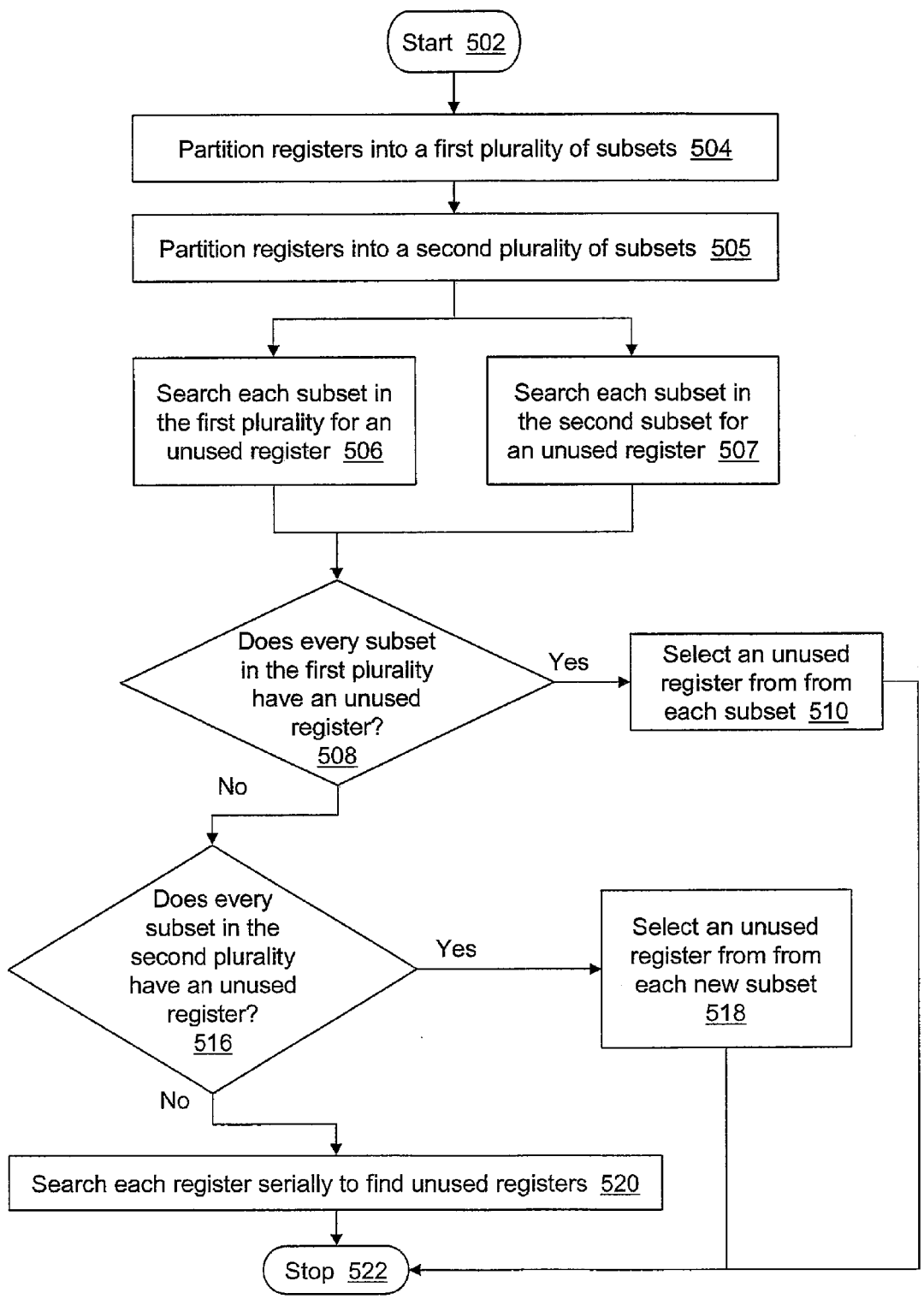
FIG. 5 shows an improved method for selecting multiple unused registers from register file 212, in accordance with one or more embodiments of the present invention.

With reference now to FIG. 5, an improved method for selecting multiple unused registers from register file 212 is illustrated. Free register selection logic 211 attempts to select a predetermined number of unused registers (e.g. four unused registers) from register file 212 for register renaming. The process starts at initiator block 502 and proceeds to step 504. At step 504, free register selection logic 211 partitions the registers of register file 212 into subsets of registers for the purpose of finding the predetermined number of unused registers. The number of subsets is equal to the predetermined number of unused registers that are to be selected by free register selection logic 211. For example, register file 212 has thirty-two registers R0-R31 from which free register selection logic 211 attempts to select four unused registers. Free register selection logic 211 therefore partitions register file 212 into four subsets S1-S4, each subset having eight registers (4 subsets×8 registers=32 registers) according to partitioning scheme 302.

At step 505, free register selection logic 211 partitions the registers of register file 212 into a second group of subsets S5-S8 according to partitioning scheme 304. The number of subsets is again equal to the predetermined number of unused registers that are to be selected by free register selection logic 211. Each subset S5-S8 has a different combination of eight registers than subsets S1-S4. Free register selection logic 211 searches each subset within a partitioning scheme for one unused register. In step 506, free register selection logic 211 searches subsets S1-S4, corresponding to partitioning scheme 302, for one unused register in each subset. Each subset S1-S4 of partitioning scheme 302 is searched in parallel with the other subsets. Searching in parallel is faster than searching serially, and partitioning register file 212 into subsets ensures that no unused register is picked twice during a parallel search. In parallel with step 506, free register selection logic 211 also searches subsets S5-S8, corresponding to partitioning scheme 304, for one unused register in each subset (parallel step 507). Each subset S5-S8 of partitioning scheme 302 is searched in parallel with subsets S5-S8 of partitioning scheme 304, as well as with subsets S1-S4 of partitioning scheme 302. By searching partitioning schemes having subsets with different combinations of registers, free register selection logic 211 has a higher probability of finding four unused registers without having to perform a serial search of each register in register file 212. One partitioning scheme may be better suited than the other at selecting four unused registers from a given distribution of unused registers in register file 212.

At step 508, free register selection logic 211 determines whether every subset S1-S4 in partitioning scheme 302 has an unused register. If every subset S1-S4 has an unused register, free register selection logic 211 selects an unused register from each subset (step 510) and the process ends at terminator 522. If every subset S1-S4 does not have at least one unused register, free register selection logic 211 determines whether every subset S5-S8 in partitioning scheme 304 has an unused register (step 516). If every subset S5-S8 has an unused register, free register selection logic 211 selects an unused register from each subset (step 518) and the process ends at terminator 522. If every subgroup S5-S8 does not have at least one unused register, the process proceeds to step 520. At step 520, free register selection logic 211 performs a serial search of each register in register file 212 to find four unused registers and the process ends (terminator 522).

The present invention is not limited to just two partitioning schemes. The number of partitioning schemes is a design implementation detail. In an alternative embodiment, free register selection logic 211 partitions the registers of register file 212 into a third group of subsets S9-S12 according to partitioning scheme 306. The number of subsets is equal to the predetermined number of unused registers that are to be selected by free register selection logic 211. Each subset S9-S12 has a different combination of eight registers than subsets S1-S4 and subsets S5-S8. In parallel with searching subsets S1-S4 of partitioning scheme 302 and subsets S5-S8 of partitioning scheme 304, free register selection logic 211 searches subsets S9-S12 of partitioning scheme 306. If every subset S1-S4 does not have at least one unused register, and every subset S5-S8 does not have at least one unused register, free register selection logic 211 determines whether every subset S9-S12 in partitioning scheme 306 has an unused register. If every subset S9-S12 in partitioning scheme 306 has an unused register, free register selection logic 211 selects an unused register from each subgroup S9-S12. If every subset S9-S12 in partitioning scheme 306 has an unused register, free register selection logic 211 performs a serial search of each register in register file 212 to find four unused registers and the process ends.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

Flowcharts and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A method for selecting a predetermined number of unused registers in a processor comprising:
    partitioning a plurality of registers in a processor into a first plurality of subsets, wherein the number of subsets of the first plurality of subsets is equal to the predetermined number of unused registers that is to be selected;
    partitioning the plurality of registers into a second plurality of subsets, wherein the number of subsets of the second plurality of subsets is equal to the predetermined number of unused registers that is to be selected and wherein each subset of the second plurality of subsets comprises a different combination of registers than each subset of the first plurality of subsets;
    searching each subset of the first plurality of subsets for an unused register;
    searching each subset of the second plurality of subsets for an unused register, wherein searching the second plurality of subsets is performed in parallel with searching the first plurality of subsets;
    determining whether every subset of the first plurality of subsets includes an unused register;
    determining whether every subset of the second plurality of subsets includes an unused register
    in response to determining that every subset of the first plurality of subsets includes an unused register, selecting an unused register from each subset of the first plurality of subsets;
    in response to determining that at least one subset of the first plurality of subsets does not include an unused register and that every subset of the second plurality of subsets includes an unused register, selecting an unused register from each subset of the second plurality of subsets; and
    in response to determining that at least one subset of the first plurality of subsets does not include an unused register and that at least one subset of the second plurality of subsets does not include an unused register, searching each register serially to find the predetermined number of unused registers.

2. The method of claim 1, further comprising:
    partitioning the plurality of registers in a processor queue into a third plurality of subsets, wherein the number of subsets of the third plurality of subsets is equal to the predetermined number of unused registers that is to be selected and wherein each subset of the third plurality of subsets comprises a different combination of registers than each subset of the first plurality of subsets and each subset of the second plurality of subsets;
    searching each subset of the third plurality of subsets for an unused register, wherein searching the third plurality of subsets is performed in parallel with searching the first plurality of subsets and the second plurality of subsets;
    determining whether each subset of the third plurality of subsets includes an unused register;
    in response to determining that at least one subset of the first plurality of subsets does not include an unused register, that at least one subset of the second plurality of subsets does not include an unused register and that every subset of the third plurality of subsets includes an unused register, selecting an unused register from each subset of the third plurality of subsets; and
    in response to determining that at least one subset of the first plurality of subsets does not include an unused register, that at least one subset of the second plurality of subsets does not include an unused register and that at least one subset of the third plurality of subsets does not include an unused register, searching each register serially to find the predetermined number of unused registers.

3. The method of claim 1, wherein said searching each subset of the first plurality of subsets for an unused register further comprises searching each subset of the first plurality of subsets for an unused register in parallel with searching the other subsets of the first plurality of subsets for an unused register.

4. The method of claim 1, wherein said searching each subset of the second plurality of subsets for an unused register further comprises searching each subset of the second plurality of subsets for an unused register in parallel with searching the other subsets of the second plurality of subsets for an unused register.

5. The method of claim 2, wherein said searching each subset of the third plurality of subsets for an unused register further comprises searching each subset of the third plurality of subsets for an unused register in parallel with searching the other subsets of the third plurality of subsets for an unused register.

6. A device for selecting a predetermined number of unused registers in a processor comprising:
    logic for partitioning a plurality of registers in a processor into a first plurality of subsets;
    logic for searching each subset of the first plurality of subsets for an unused register;
    logic for determining whether every subset of the first plurality of subsets includes an unused register;
    logic, responsive to determining that every subset of the first plurality of subsets includes an unused register, for selecting an unused register from each subset of the first plurality of subsets;
    logic, responsive to determining that at least one subset of the first plurality of subsets does not include an unused register, comprising:
        logic for partitioning the plurality of registers in a processor queue into a second plurality of subsets, wherein each subset of the second plurality of subsets comprises a different combination of registers than each subset of the first plurality of subsets;
        logic for searching each subset of the second plurality of subsets for an unused register;
        logic for determining whether each subset of the second plurality of subsets includes an unused register;
        logic, responsive to determining that every subset of the second plurality of subsets includes an unused register, for selecting an unused register from each subset of the second plurality of subsets; and
        logic, responsive to determining that at least one subset of the second plurality of subsets does not include an unused register, for searching each register serially to find the predetermined number of unused registers.

7. The device of claim 6, wherein the logic responsive to determining that at least one subset of the second plurality of subsets does not include an unused register comprises:
- logic for partitioning the plurality of registers in a processor queue into a third plurality of subsets, wherein each subset of the third plurality of subsets comprises a different combination of registers than each subset of the first plurality of subsets and each subset of the second plurality of subsets;
- logic for searching each subset of the third plurality of subsets for an unused register;
- logic for determining whether each subset of the third plurality of subsets includes an unused register;
- logic, responsive to determining that every subset of the third plurality of subsets includes an unused register, for selecting an unused register from each subset of the third plurality of subsets; and
- logic, responsive to determining that at least one subset of the third plurality of subsets does not include an unused register, for searching each register serially to find the predetermined number of unused registers.

8. The device of claim 6, wherein said logic for searching each subset of the first plurality of subsets for an unused register further comprises logic for searching each subset of the first plurality of subsets for an unused register in parallel with searching the other subsets of the first plurality of subsets for an unused register.

9. The device of claim 6, wherein said logic for searching each subset of the second plurality of subsets for an unused register further comprises logic for searching each subset of the second plurality of subsets for an unused register in parallel with searching the other subsets of the second plurality of subsets for an unused register.

10. The device of claim 7, wherein said logic for searching each subset of the third plurality of subsets for an unused register further comprises logic for searching each subset of the third plurality of subsets for an unused register in parallel with searching the other subsets of the third plurality of subsets for an unused register.

11. A system for selecting a predetermined number of unused registers in a processor comprising:
- one or more functional units for executing computer instructions;
- a register file comprising a plurality of registers connected to said one or more functional units;
- logic for partitioning a plurality of registers in a processor into a first plurality of subsets;
- logic for searching each subset of the first plurality of subsets for an unused register;
- logic for determining whether every subset of the first plurality of subsets includes an unused register;
- logic, responsive to determining that every subset of the first plurality of subsets includes an unused register, for selecting an unused register from each subset of the first plurality of subsets;
- logic, responsive to determining that at least one subset of the first plurality of subsets does not include an unused register, comprising:
  - logic for partitioning the plurality of registers in a processor queue into a second plurality of subsets, wherein each subset of the second plurality of subsets comprises a different combination of registers than each subset of the first plurality of subsets;
  - logic for searching each subset of the second plurality of subsets for an unused register;
  - logic for determining whether each subset of the second plurality of subsets includes an unused register;
  - logic, responsive to determining that every subset of the second plurality of subsets includes an unused register, for selecting an unused register from each subset of the second plurality of subsets; and
  - logic, responsive to determining that at least one subset of the second plurality of subsets does not include an unused register, for searching each register serially to find the predetermined number of unused registers.

12. The system of claim 11, wherein the logic responsive to determining that at least one subset of the second plurality of subsets does not include an unused register comprises:
- logic for partitioning the plurality of registers in a processor queue into a third plurality of subsets, wherein each subset of the third plurality of subsets comprises a different combination of registers than each subset of the first plurality of subsets and each subset of the second plurality of subsets;
- logic for searching each subset of the third plurality of subsets for an unused register;
- logic for determining whether each subset of the third plurality of subsets includes an unused register;
- logic, responsive to determining that every subset of the third plurality of subsets includes an unused register, for selecting an unused register from each subset of the third plurality of subsets; and
- logic, responsive to determining that at least one subset of the third plurality of subsets does not include an unused register, for searching each register serially to find the predetermined number of unused registers.

13. The system of claim 11, wherein said logic for searching each subset of the first plurality of subsets for an unused register further comprises logic for searching each subset of the first plurality of subsets for an unused register in parallel with searching the other subsets of the first plurality of subsets for an unused register.

14. The system of claim 11, wherein said logic for searching each subset of the second plurality of subsets for an unused register further comprises logic for searching each subset of the second plurality of subsets for an unused register in parallel with searching the other subsets of the second plurality of subsets for an unused register.

15. The system of claim 12, wherein said logic for searching each subset of the third plurality of subsets for an unused register further comprises logic for searching each subset of the third plurality of subsets for an unused register in parallel with searching the other subsets of the third plurality of subsets for an unused register.

* * * * *